United States Patent
Kean et al.

(10) Patent No.: US 11,356,622 B1
(45) Date of Patent: Jun. 7, 2022

(54) SINGLE-ENDED CAPACITIVE TRANS-IMPEDANCE AMPLIFIER (CTIA) UNIT CELL FOR TWO-COLOR APPLICATIONS

(71) Applicant: RAYTHEON COMPANY, Waltham, MA (US)

(72) Inventors: Bryan W. Kean, Denver, CO (US); John L. Vampola, Santa Barbara, CA (US); Joshua J. Cantrell, Santa Barbara, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/214,751

(22) Filed: Mar. 26, 2021

(51) Int. Cl.
| | | |
|---|---|---|
| H04N 5/353 | (2011.01) | |
| H04N 5/374 | (2011.01) | |
| H04N 5/378 | (2011.01) | |
| H03F 3/08 | (2006.01) | |
| H03F 3/45 | (2006.01) | |
| H03F 1/00 | (2006.01) | |
| H03F 1/02 | (2006.01) | |
| H03F 1/22 | (2006.01) | |
| H04N 5/3745 | (2011.01) | |

(52) U.S. Cl.
CPC ....... *H04N 5/3532* (2013.01); *H04N 5/37457* (2013.01)

(58) Field of Classification Search
CPC .... H04N 5/353; H04N 5/3532; H04N 5/3742; H04N 5/37457; H04N 5/378; H04N 9/045; H04N 9/0451; H04N 5/3745; H03F 1/00; H03F 1/0205; H03F 1/22; H03F 3/08; H03F 3/45089; H03F 3/45095; H03F 2203/7203; H03F 2203/7206

See application file for complete search history.

(56) References Cited

U.S. PATENT DOCUMENTS

| | | | |
|---|---|---|---|
| 6,704,046 | B2 | 3/2004 | Dyas et al. |
| 7,492,399 | B1* | 2/2009 | Gulbransen .......... H04N 5/2355 348/294 |
| RE43,085 | E | 1/2012 | Lin et al. |
| 2007/0007437 | A1* | 1/2007 | Olsen .................. H03F 3/08 250/214 A |
| 2010/0176275 | A1* | 7/2010 | Vampola ............... H03F 3/08 250/214 A |
| 2016/0014366 | A1* | 1/2016 | Chiaverini ......... H04N 5/37457 |
| 2016/0285419 | A1* | 11/2016 | Milkov ................ H03F 1/0205 |
| 2018/0201141 | A1* | 7/2018 | Wang .................... H04N 5/369 |

(Continued)

*Primary Examiner* — Marly S Camargo
(74) *Attorney, Agent, or Firm* — Cantor Colburn LLP

(57) ABSTRACT

An image capturing device is provided, which includes a capacitive trans-impedance amplifier (CTIA) unit cell. The CTIA unit cell includes an image detector and a switching network. The image detector is configured to detect light having a first color and light having a second color different from the first color, and to generate a photocurrent in response to detecting the light. The switching network includes a CTIA switch, a CTIA low reset switch, and a CTIA high-reset biasing switch. The CTIA switch sets a first reset level of the CTIA unit cell to a first voltage in response invoking a first switching state of the CTIA low-reset switch and sets a second reset level of the CTIA to a second voltage greater than the first voltage level in response to invoking a second switching state of the CTIA low-reset switch.

20 Claims, 6 Drawing Sheets

(56) References Cited

U.S. PATENT DOCUMENTS

2019/0075262 A1\* 3/2019 Douence .............. H04N 5/3559
2020/0067469 A1\* 2/2020 Li
2020/0169681 A1\* 5/2020 Stobie .................... H04N 5/378
2021/0320147 A1\* 10/2021 Smit ................. H01L 27/14658

\* cited by examiner

SINGLE-ENDED CAPACITIVE TRANS-IMPEDANCE AMPLIFIER (CTIA) UNIT CELL FOR TWO-COLOR APPLICATIONS

BACKGROUND

The present disclosure relates to imaging systems, and more particularly, to a capacitive trans-impedance amplifier (CTIA) unit cell included in an image capturing device.

Image detectors used in image capturing devices generate charge in proportion to light intensity received at the image sensor from a scene viewed by the image sensor. Imaging of scenes with low ambient light requires an image detector to have components with low noise and low capacitance in order to provide high sensitivity. In contrast, imaging a scene with bright ambient light requires the image detector to have components with higher capacitance in order to store more generated charge. These competing capacitance requirements have led to the development of image capturing devices that are typically optimized for either a bright ambient light scene or a low ambient light scene.

SUMMARY

According to a non-limiting embodiment, a capacitive trans-impedance amplifier (CTIA) unit cell circuit included in an image capturing device is provided. The CTIA unit cell includes an image detector and a switching network. The image detector is configured to detect light having a first color and light having a second color different from the first color, and to generate a photocurrent in response to detecting the light. The switching network includes a CTIA switch, a CTIA low reset switch, and a CTIA high-reset biasing switch. The CTIA switch sets a first reset level of the CTIA unit cell to a first voltage in response invoking a first switching state of the CTIA low-reset switch and sets a second reset level of the CTIA to a second voltage greater than the first voltage level in response to invoking a second switching state of the CTIA low-reset switch.

According to another non-limiting embodiment, a capacitive trans-impedance amplifier (CTIA) unit cell circuit included in an image capturing device is provided. The CTIA unit cell includes an image detector and a switching network. The image detector is configured to detect light having a first color and light having a second color different from the first color, and to generate a photocurrent in response to detecting the light. The switching network is in signal communication with the image detector. The switching network includes a CTIA switch, a CTIA low reset switch, a CTIA high-reset biasing switch, and a high-reset cut-off switch. The CTIA switch sets a first reset level to a first voltage in response invoking a first switching state of the CTIA low-reset switch and sets a second reset level to a second voltage greater than the first voltage level in response to invoking a second switching state of the CTIA low-reset switch. The switching state of the high-reset cut-off switch selectively connects the CTIA switch to the switching network or disconnects the CTIA switch from the switching network.

A method of controlling a capacitive trans-impedance amplifier (CTIA) unit cell circuit is provided. The method comprises selectively detecting, via an image detector, light having a first color or light having a second color different from the first color, and generating, via the image detector, a photocurrent in response to detecting the light. The method further comprises operating a CTIA switch included in a switching network of the CTIA unit cell circuit to set a first reset level to a first voltage in response invoking a first switching state of a CTIA low-reset switch included in the CTIA unit cell circuit. The method further comprises operating the CTIA switch to set a second reset level to a second voltage greater than the first voltage level in response to invoking a second switching state of the CTIA low-reset switch.

Additional features and advantages are realized through the techniques of the present disclosure. Other embodiments and aspects are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
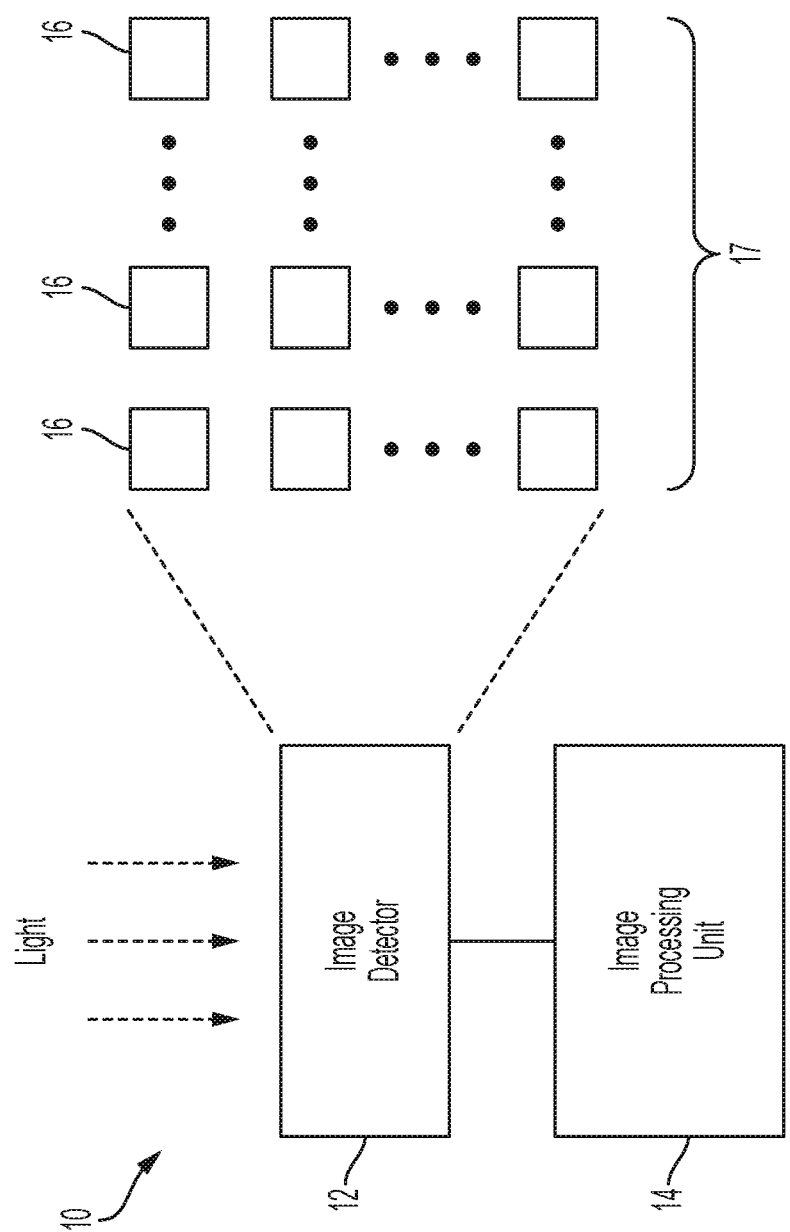
FIG. 1 is a block diagram illustrating an image capturing device configured to capture images in accordance to a non-limiting embodiment.

Existing imaging circuitry often utilizes CTIA architecture in combination with sample-hold circuitry to facilitate light detection. For instance, many conventional read-out integrated circuit (ROIC) unit cells include a CTIA for processing a charge generated by a photodiode included in an image detector. More specifically, the photodiode generates a photocurrent in response to receiving light. The photocurrent induces a charge, which is accumulated at a capacitor within the circuit and is effectively integrated to produce an output voltage. The output voltage corresponds to the intensity of the flux over a given time interval, generally referred to as the integration interval. Such circuits generally convey the output voltage to downstream components and reset the CTIA unit cell (e.g., reset the voltage of the capacitor) to a reset value. For instance, the output voltage may be sampled and held at a sample-hold capacitor, and periodically bled and digitized by circuitry associated with the unit cell to generate one or more binary values that can be further processed by imaging hardware and/or software, Imaging capturing devices can implement unit cell circuits of various designs to serve as an imaging pixel. Imaging capturing devices configured to detect infrared (IR) light, for example, typically include direct injection circuits or CTIA unit cell circuits. DI circuits have been employed in focal plane applications and image detection devices. However, DI circuits traditionally have difficulty handling the different requirements of low and bright ambient light situations. More specifically, DI circuits are typically configured for a fixed gain (or charge capacity) which can result in too little gain for the dark regions of an image, or too much gain (i.e., saturation) for the bright regions of an image.

CTIA unit cell circuits have also been employed as image pixels because they provide superior sensitivity compared to a DI unit cell circuit (i.e., DI pixels). Single-end CTIA pixels have been particularly desirable because they provide lower noise compared to differential CTIA pixels, i.e., CTIA unit cell circuits that operate according to a differential amplifier. However, conventional CTIA pixels are limited in functionality in that the detector reset level necessary for pixel reset is set at a fixed voltage and the point at which it starts integrating (i.e., the reset voltage level) is set to a fixed level. In conventional single-end CTIA pixel, this fixed integration level is set by a MOSFET threshold and cannot be changed.

The limitation caused by the fixed integration level described above causes the output of conventional CTIA pixels to integrate in only one direction to provide useful operation. To achieve two-color, dual-polarity detection, however, the pixel integration must be allowed to integrate in opposing directions (i.e., in a positive integrating direction to capture the first light color or first energy band and a negative integrating direction to capture the second light color or second energy band). Consequently, conventional CTIA unit cell circuits cannot serve as a pixel capable of facilitating a two-color, dual-polarity image capturing device.

Various non-limiting embodiments described herein provide a CTIA unit cell circuit that employs an image detector including an opposing pair of image sensors. Each image sensor is configured to detect a respective color of light. The CTIA unit cell circuit allows for selectively setting a targeted output voltage that can serve as integration reset levels for both image sensors using the single-ended CTIA. In this manner, the CTIA unit cell circuit described herein can serve as a pixel capable of facilitating a two-color, dual-polarity image capturing device.

With reference now to FIG. 1, an image capture device 10 configured to capture images is illustrated according to a non-limiting embodiment. The image capture device 10 can be constructed as various devices including, but not limited to, a digital camera, video camera, or other photographic and/or image capturing equipment. The image capture device 10 includes an image detector 12 and an image processing unit 14 (e.g., an image processor or controller configured to perform image processing). The image detector 12 may be an APS or other suitable light sensing device that can capture images. The image processing unit 14 may be a combination of hardware, software, and/or firmware that is operable to receive signal information from the image detector 12 and convert the signal information into a digital image.

In the illustrated example, the image detector 12 includes an array 17 of unit cells 16. Each unit cell 16 accumulates charge proportional to the light intensity at its location in the field of view of the image detector 12. Each unit cell 16 may correspond to a pixel in the captured electronic image. Each unit cell 16 may temporarily store the accumulated charge for use by the processing unit 14 to create an image. The stored charge, for example, may be converted into a voltage and the value of the voltage may be sampled by the processing unit 14 in order to digitize and store the value into some form of memory.

A particular method for image capture using the image capture device 10 may be rolling shutter capture. Rolling shutter capture is a method that captures each row of pixels from the image detector 12 in order. For example, rolling shutter capture may expose the top row of pixels of the image detector 12 to light, followed by the second row, followed by the third row, and so forth until the last row of pixels of the image detector 12 is exposed to light. Another example of a method by which the image processing unit 14 may receive pixel information captured by image detector 12 is "rolling read" (sometimes referred to as a "ripple read"). A rolling read is a method that processes each row of pixels from the image detector 12 in order. Similar to rolling shutter capture, ripple read may process the top row of pixels of the image detector 12, followed by the second row, followed by the third row, and so forth until the last row of pixels of the image detector 12 is processed. A rolling reset operation to reset the rows of pixels of the image detector 12 may be performed similarly.

The rolling shutter capture, rolling read, and rolling reset operations are typically performed on consecutive rows. For example, a rolling capture operation may begin with a first row of unit cells 16. As the rolling capture operation moves to the second row, a rolling read operation may begin on the first row of unit cells 16. After the rolling capture operation moves to the third row, the rolling read operation may begin on the second row and a rolling reset operation may begin on the first row. This may continue until the last row is processed. Once the last row is processed, the image may be processed and stored by the processing unit 14.

Although rolling based operations are described above for the capturing of an image using the image capture device 10, in other embodiments, the image capture device 10 may use a different image capture method. For example, in at least one embodiment, the image capture device utilizes a global shutter based method in which all the unit cells 16 in the image capture device 10 are configured to start integrating flux and stop integrating flux at the same time.

Figure 2:
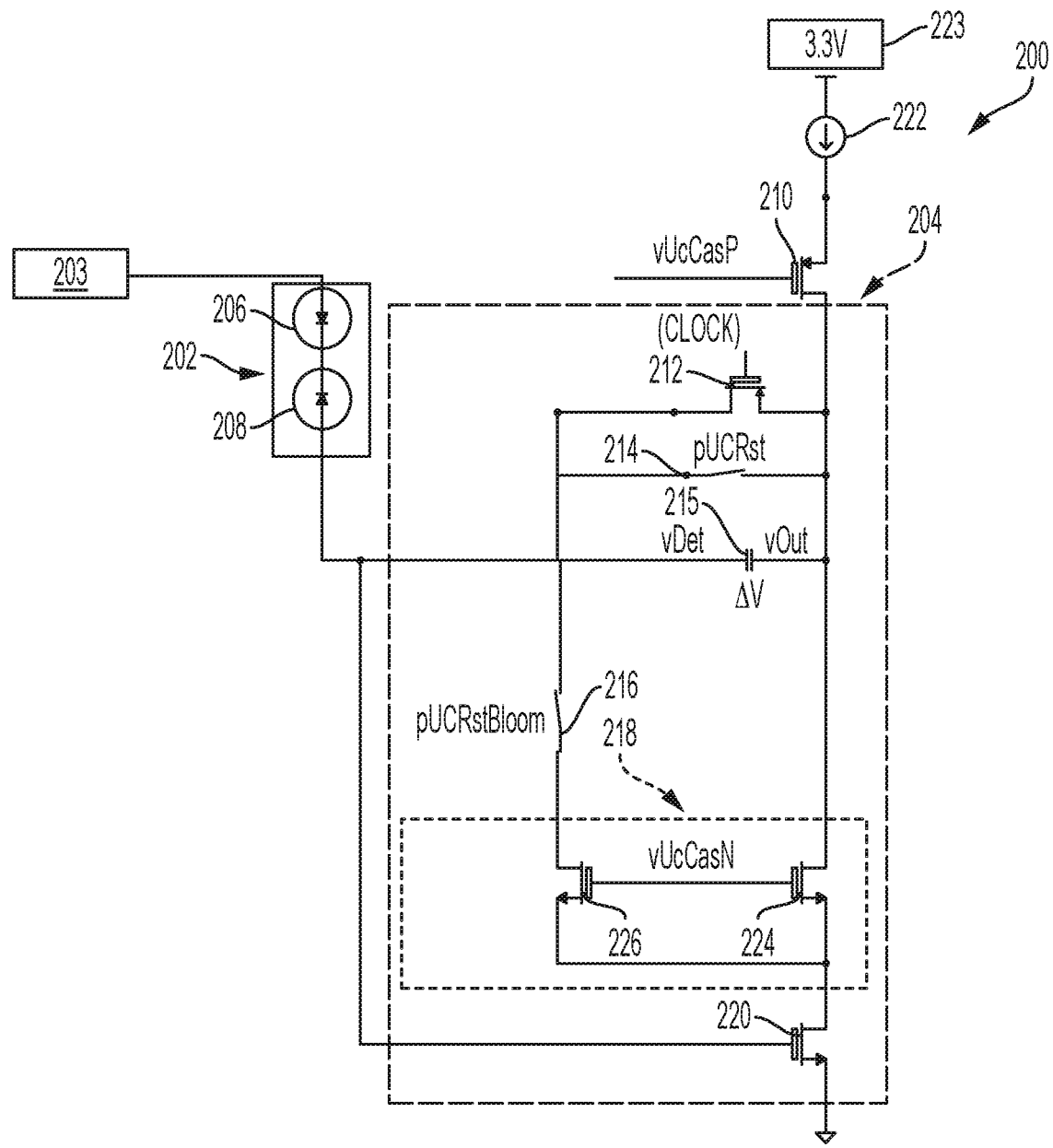
FIG. 2 depicts a CTIA unit cell circuit according to a non-limiting embodiment.

Turning now to FIG. 2, a CTIA unit cell 200 included in an image capturing device is illustrated according to a non-limiting embodiment. The CTIA unit cell 200 includes and an image detector 202 and a switch network 204. The image detector 202 is configured to generate a photocurrent in response to receiving light. The image detector 202 includes a pair of opposing connected photodiodes 206 and 208, which serve as image sensors capable of facilitating two-color, dual-band image detection. The first photodiode 206 can be configured to detect a first color or first energy band (e.g., bright ambient light) while the second photodiode 208 can be configured to detect a different second color or second energy band (e.g., low ambient light).

In a non-limiting embodiment, the opposing connection of the photodiodes 206 and 208 can be established by connecting a first cathode of the first photodiode 206 to a second cathode of the second photodiode 208. According to another non-limiting embodiment, the opposing connection of the photodiodes 206 and 208 can be established by connecting a first anode of the first photodiode 206 to a second anode of the second photodiode 208. In either arrangement, the first and second photodiodes 206 and 208 have an opposite polarity and can be selectively activated based on the direction of electrical current flowing through the image detector 202 to establish a detector bias. For example, the first photodiode 206 realizes a forward biased state while the second photodiode 208 realizes a reverse biased state when current exits the image detector 202. As a result, the first photodiode 206 is activated while the second photodiode 208 is deactivated. However, the second photodiode 208 realizes a forward biased state while the first photodiode 206 realizes a reverse biased state when current flows into the image detector 202. As a result, the second photodiode 208 is activated while the first photodiode 206 is deactivated. In this manner, the image detector 202 can dynamically activate the proper photodiode 206 or 208 to detect the first color or first energy band (e.g., bright ambient light) or the second color or second energy band (e.g., low ambient light), respectively based on the voltage difference (ΔV) between the output voltage (vOut) set by voltage source 223 and the input detector voltage (vDet) set by the image detector 202.

The switching network 204 is connected to a current source 222 that is driven by a voltage source 223. Although the voltage source is illustrated as supplying 3.3 volts (V), for example, the supply voltage is not limited thereto. The switching network 204 includes a cascode bias switch 210, a CTIA switch 212, a CTIA low reset switch 214, a capacitor 215, a CTIA high-reset biasing switch 216, a cascode bias circuit 218, and a slew control transistor 220. The current source 222, cascode bias switch 210, cascode bias circuit 218, and slew control transistor 220 establish a CTIA transistor bias current path. Similarly, the current source 222, cascode bias switch 210, CTIA switch 212, CTIA high-reset biasing switch 216, cascode bias circuit 218, and slew control transistor 220 establish a CTIA reset current path.

The cascode bias switch 210 is optional and can be constructed as a field effect transistor (FET), for example, for selectively delivering voltage from a voltage supply 223 to the CTIA unit cell 200. For example, the cascode bias switch 210 can include a gate configured to receive a power control signal (e.g., generated by a controller), a source configured to receive supply voltage provided by the voltage supply 223, and a drain connected in common with the switch network 204 and the anode of the second photodiode 208. Accordingly, disconnected the power control signal from the gate switches off the cascode bias switch 210 and blocks current from flowing through the switching network 204, while a delivering the power control signal to the gate switches on the cascode bias switch 210 and induces current flow through the switching network 204.

The CTIA switch 212, the CTIA low reset switch 214, and the capacitor 215 are connected in parallel with one another. The CTIA switch 212 is configured to divert excess photocurrent and/or define the output reset level of the image detector 202. In one or more non-limiting embodiments, the CTIA switch 212 can be implemented as a field effect transistor (FET). The gate is configured to receive a high-reset control signal (e.g., "CLOCK" generated by a controller). The source is connected in common with the drain of the optional cascode bias switch 210 and a first terminal of the CTIA low reset switch so as allow either the CTIA switch 212 to reset the CTIA unit cell 200 to a high level output, or switch 214 to reset the CTIA unit cell 200 to a low level output. The drain is connected to an opposing second terminal of the CTIA low reset switch 214. Capacitor 215 is utilized to collect photocurrent while the CTIA low reset switch 214 is open and the CTIA switch 212 is not conducting current.

The cascode bias circuit 218 (e.g., a cascode mirror) is selectively connected in parallel with the CTIA switch 212, the CTIA low reset switch 214, and the capacitor 215 via the CTIA high-reset biasing reset switch 216. The cascode bias circuit 218 allows current to flow in both the CTIA transistor bias current path as well as the CTIA reset current path to ensure that the CTIA switch 212 remains biased so that there is not a significant time-constant associated with resetting the CTIA switch 212.

The cascode bias circuit 218 includes a first FET 224 and an opposing second FET 226. Each of the first and second FETs 224 and 226 have a respective gate that is connected to one another. The first FET 224 includes a source connected to the drain of the slew control transistor 220, and a drain connected in common with the first terminal of the CTIA low reset switch 214, the source of the CTIA switch 212, and the drain of the optional cascode bias switch 210. The second FET 226 has a source connected in common with the source of the opposing first FET 224 and the drain of the slew control transistor 220. The drain of the second FET 226 is connected to a first terminal of the CTIA high-reset biasing switch 216. The opposing second terminal of the CTIA high-reset biasing switch 216 is connected in common with the opposing second terminal of the CTIA low reset switch 214 and the drain of the CTIA switch 212 so as to selectively connect the cascode bias circuit 218 in parallel with the CTIA switch 212, the CTIA low reset switch 214, and the capacitor 215.

In at least one non-limiting embodiment, the CTIA switch 212 is constructed as an anti-bloom transistor. Anti-bloom transistors are used in conventional imaging devices to allow charge to dissipate without affecting neighbor pixels. The transistor effectively "drains" excess charge spilling over so as to prevent blooming from occurring in the pixel (.e.g., to prevent a bright light from spreading to other neighboring pixels). Traditional anti-bloom transistors are biased according to a fixed gate signal to maintain the anti-bloom transistor in a steady state.

According to a non-limiting embodiment, the CTIA switch 212 operates in conjunction with the CTIA low reset switch 214 and the CTIA high-reset biasing switch 216 to not only operate as an anti-bloom transistor for reducing or preventing blooming, but to also reset the CTIA unit cell 200 to a first positive voltage level (e.g., a low reset level) and a second higher voltage level (e.g., a high reset level). In addition, the high reset level achieved using the inventive teachings described herein allows for performing a negative integration through a substantially larger dynamic range compared to conventional two-color, CTIA dual band unit cell circuits.

Figure 3:
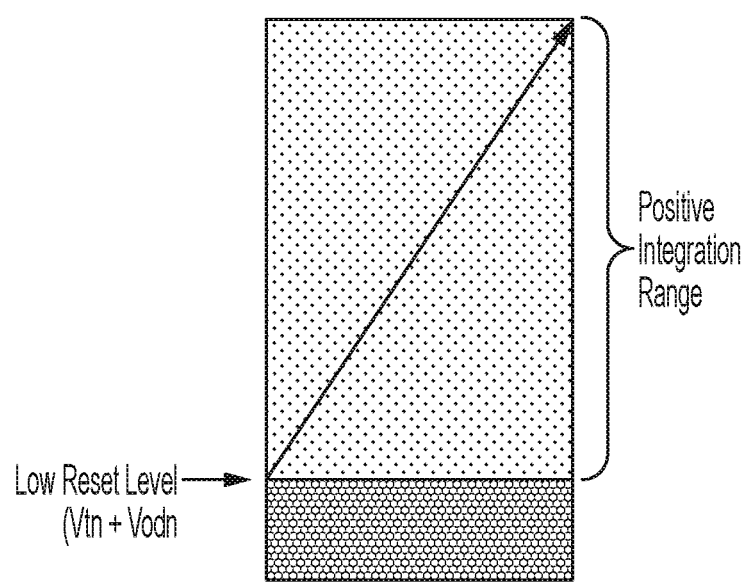
FIG. 3 is a diagram depicting a positive integration range provided by a CTIA unit cell circuit according to a non-limiting embodiment.
Figure 4:
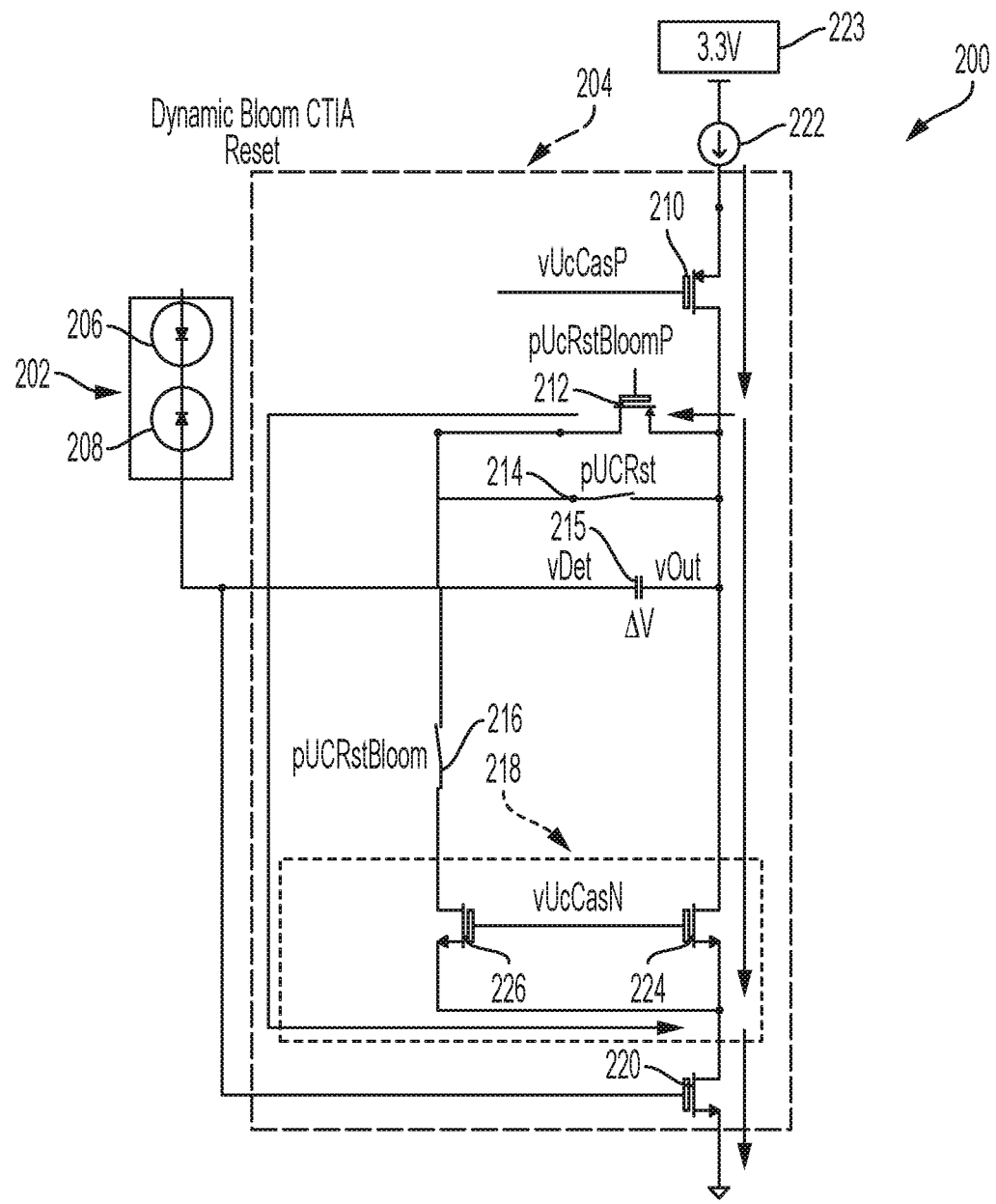
FIG. 4 depicts the CTIA unit cell circuit of FIG. 2 operating in a reset mode according to a non-limiting embodiment.
Figure 5:
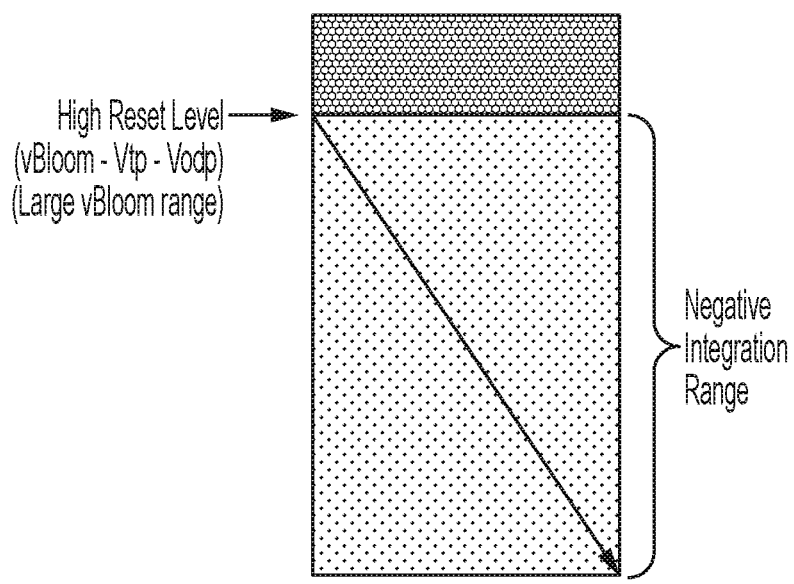
FIG. 5 is a diagram depicting a negative integration range provided by a CTIA unit cell circuit according to a non-limiting embodiment.

With continued reference to FIG. 2 along with FIGS. 3, 4 and 5, operation of the CTIA unit cell 200 is described in greater detail. According to a non-limiting embodiment, the CTIA low reset switch 214 can be closed while the CTIA high-reset biasing switch 216 is open and the CTIA switch 212 is turned off (e.g. in the open state) at the start of integration. In this scenario, the CTIA low reset switch 214 is connected in parallel with the CTIA switch 212. Accordingly, electrical current is split between the CTIA low reset switch 214 and the CTIA switch 212 to define the detector level and the low reset level. In addition, the CTIA low reset switch 214 is configured to accommodate current that is output from the unit cell 200 and thus exiting the image detector 202. In this manner, the CTIA switch 212 can operate as an anti-bloom transistor when the CLOCK signal is at a "high" level (e.g., a logic "1").

Referring to FIG. 3, a positive integration corresponding to the activated first photodiode 206 can be performed in response to opening switches 212, 214, 216. For example, the positive integration begins at the low reset level and extends in a positive slope-direction through the positive integration rage.

When, however, the CTIA low reset switch 214 remains open and the CTIA high-reset biasing switch 216 is closed, electrical current driven by the cascode bias circuit 218 is delivered through the CTIA switch 212 based on the level of the clock signal (CLOCK) applied to the CTIA switch gate. The high reset level at the vOut node is therefore set according to a higher voltage level compared to that of the voltage level corresponding to the low reset level, and dependent on the voltage delivered to the gate of the CTIA switch 212.

Turning to FIG. 4, the clocked high-reset control signal (CLOCK) applied to the gate of the CTIA switch 212 also allows the CTIA switch 212 to accommodate the electrical current that is delivered into the CTIA unit cell 200 for performing negative integration associated with the second photodiode 208 when the CTIA high-reset biasing switch 216 is opened. For example, rather than maintain the CTIA switch 212 in steady-state, the CTIA switch 212 can be clocked (e.g., a clock signal can be generated by a controller and applied to the switch) while the CTIA low reset switch 214 is open allowing a high reset level to be defined with one clock level, and integration of photo-charge with another clock level. When the CTIA high-reset biasing switch 216 is opened, it allows current to flow to the CTIA capacitor 215 to integrate photocurrent while current flows into the CTIA unit cell 200.

Referring to FIG. 5, a negative integration can be performed on the activated second photodiode 208 in response to electrical current entering the image detector 202 from the switching network 204. The negative integration can be initiated without performing an anti-bloom operation in response to opening each of the CTIA switch 212, the CTIA low reset switch 214, and the CTIA high-reset biasing switch 216 while the CLOCK signal is also at a "high" level. Accordingly, the negative integration begins at the high reset level and extends in a negative slope-direction through the negative integration rage. Unlike conventional single-ended CTIA unit cell circuits, the dynamic range of the negative integration is substantially larger due to the ability to dynamically set the high level reset to a higher voltage level above the voltage level of the low reset level.

When setting the high state during the CTIA unit cell reset as described above, the slew control transistor 220 controls the negative slew rate of the CTIA unit cell 200. Accordingly, the slew control transistor 220 can provide slew rates that are larger than what can be set using conventional CTIA unit cell circuits. In addition, the slew control transistor 220 can be utilized to establish a feedback control loop. In this manner, the slew control transistor 220 can draw more current when excess photocurrent is detected. This larger bias results in the slew control transistor 220 sourcing additional current, and thus accommodating higher photo current levels.

Figure 6:
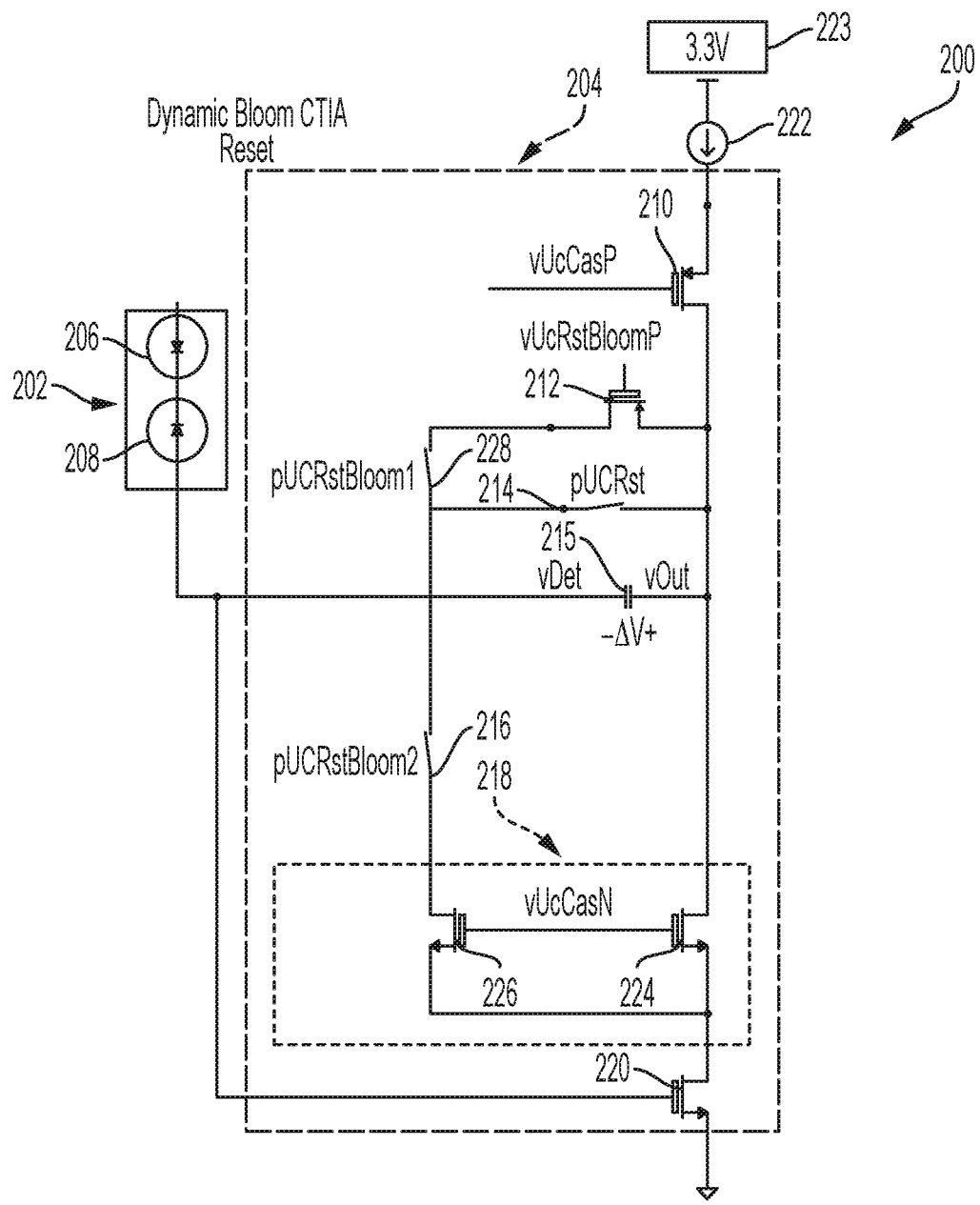
FIG. 6 depicts a CTIA unit cell circuit according to another non-limiting embodiment.

Turning to FIG. 6, a CTIA unit cell circuit 200 is illustrated according to another non-limiting embodiment. The CTIA unit cell circuit 200 is similar to the circuit described above, but contains an additional switch 228 referred to herein as a high-reset cut-off switch 228. The high-reset cut-off switch 228 includes a first terminal connected in common with the second terminal of the CTIA low reset switch 214 and the second terminal of the CTIA high-reset biasing switch 216. In one or more non-limiting embodiments, the high-reset cut-off switch 228 can be clocked (e.g., a clock signal can be generated by a controller and applied to the switch 228). When the high-reset cut-off switch 228 is closed, the CTIA switch 212 is connected in parallel with the CTIA low reset switch 214 and the capacitor 215 such that it can set the high level reset of the CTIA unit cell 200 as described herein. When, however, the high-reset cut-off switch 228 is open, the CTIA switch 212 is isolated and disconnected from the switching network 204. Implementing the high reset cut-off switch 228 reduces the need to apply precise voltages as a clock to the CTIA switch 212, thereby allowing a single bias to be applied to the CTIA switch 212 during reset and integration in a single direction.

As described herein, various non-limiting embodiments described herein provide a CTIA unit cell circuit that employs an image detector including an opposing pair of photo sensors configured to facilitate two-color, dual-polarity image capturing. Each photo sensor is configured to detect a respective color or bandwidth of light. The CTIA unit cell circuit allows for selectively setting a targeted output voltage for both image sensors using the single-ended CTIA. The CTIA unit cell includes a CTIA high-reset switch that operates in conjunction with a CTIA low-reset switch and a CTIA high-reset biasing switch to not only operate as an anti-bloom transistor for reducing or preventing blooming, but to also reset the CTIA unit cell to a first positive voltage level (e.g., a low reset level) and a second higher voltage level (e.g., a high reset level). In addition, the high reset level achieved using the inventive teachings described herein allows for performing a negative integration through a substantially larger dynamic range compared to conventional two-color, dual band unit cell circuits. In this manner, the CTIA unit cell circuit described herein can serve as an image pixel capable of facilitating two-color, dual-polarity image capturing with high density, low noise, and low power consumption compared to conventional CTIA pixels.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiments were chosen and described in order to best explain the principles of the present disclosure and the practical application, and to enable others of ordinary skill in the art to understand the present disclosure for various embodiments with various modifications as are suited to the particular use contemplated.

While the preferred embodiments to the present disclosure have been described, it will be understood that those skilled in the art, both now and in the future, may make various improvements and enhancements which fall within the scope of the claims which follow. These claims should be construed to maintain the proper protection of the inventive teachings recited herein.

What is claimed is:

1. A capacitive trans-impedance amplifier (CTIA) unit cell included in an image capturing device, the CTIA unit cell comprising:
   an image detector configured to selectively detect light having a first color and light having a second color different from the first color and to generate a photocurrent in response to detecting the light; and a switching network in signal communication with the image detector, the switching network including a CTIA switch, a CTIA low reset switch, and a CTIA high-reset biasing switch, wherein the CTIA switch sets a first reset level to a first voltage in response invoking a first switching state of the CTIA low-reset switch and sets a second reset level to a second voltage greater than the first voltage level in response to invoking a second switching state of the CTIA low-reset switch.

2. The CTIA unit cell circuit of claim 1, wherein the CTIA switch and the CTIA low-reset switch are connected in parallel with one another.

3. The CTIA unit cell circuit of claim 2, wherein the CTIA high-reset switch includes as a field effect transistor (FET) having a gate configured to receive a clocked high-reset control signal, a source in signal communication with a first terminal of the CTIA low-reset switch to receive a supply voltage, and a drain in signal communication with an opposing second terminal of the CTIA low-reset switch.

4. The CTIA unit cell circuit of claim 3, further comprising a cascode bias circuit that is selectively connected in parallel with the CTIA switch and a CTIA low-reset switch based on a switching state of the CTIA high-reset biasing switch.

5. The CTIA unit cell circuit of claim 4, wherein the cascode bias circuit is connected in parallel with the CTIA high-reset switch and the CTIA low-reset switch based at least in part on a switching state of the CTIA high-reset biasing switch such that current driven by the CTIA high-reset biasing switch is selectively delivered to the one or both of the CTIA switch and the CTIA low-reset switch.

6. The CTIA unit cell circuit of claim 5, wherein the CTIA switch is configured to selectively dissipate electrical charge from the CTIA unit cell circuit to prevent blooming and set the second reset level of the CTIA unit cell circuit.

7. A capacitive trans-impedance amplifier (CTIA) unit cell included in an image capturing device, the CTIA unit cell comprising:
an image detector configured to selectively detect light having a first color and light having a second color different from the first color and to generate a photocurrent in response to detecting the light; and
a switching network in signal communication with the image detector, the switching network including a CTIA switch, a CTIA low reset switch, a CTIA high-reset biasing switch, and a high-reset cut-off switch,
wherein the CTIA switch sets a first reset level to a first voltage in response invoking a first switching state of the CTIA low-reset switch and sets a second reset level to a second voltage greater than the first voltage level in response to invoking a second switching state of the CTIA low-reset switch, and
wherein the switching state of the high-reset cut-off switch selectively connects the CTIA switch to the switching network or disconnects the CTIA switch from the switching network.

8. The CTIA unit cell circuit of claim 7, wherein the CTIA switch and the CTIA low-reset switch are connected in parallel with one another.

9. The CTIA unit cell circuit of claim 8, wherein the CTIA high-reset switch includes as a field effect transistor (FET) having a gate configured to receive a clocked high-reset control signal, a source in signal communication with a first terminal of the CTIA low-reset switch to receive a supply voltage, and a drain in signal communication with an opposing second terminal of the CTIA low-reset switch.

10. The CTIA unit cell circuit of claim 9, further comprising a cascode bias circuit that is selectively connected in parallel with the CTIA switch and a CTIA low-reset switch based on a switching state of the CTIA high-reset biasing switch.

11. The CTIA unit cell circuit of claim 10, wherein the cascode bias circuit is connected in parallel with the CTIA high-reset switch and the CTIA low-reset switch based at least in part on a switching state of the CTIA high-reset biasing switch such that current driven by the CTIA high-reset biasing switch is selectively delivered to the one or both of the CTIA switch and the CTIA low-reset switch.

12. The CTIA unit cell circuit of claim 11, wherein the CTIA switch is configured to selectively dissipate electrical charge from the CTIA unit cell circuit to prevent blooming and set the second reset level of the CTIA unit cell circuit.

13. The CTIA unit cell circuit of claim 7, wherein a single bias is applied to the CTIA switch while performing a reset operation of the CTIA unit cell.

14. A method of controlling a capacitive trans-impedance amplifier (CTIA) unit cell circuit, the method comprising:
selectively detecting, via an image detector, light having a first color or light having a second color different from the first color;
generating, via the image detector, a photocurrent in response to detecting the light;
operating a CTIA switch included in a switching network of the CTIA unit cell circuit to set a first reset level to a first voltage in response invoking a first switching state of a CTIA low-reset switch included in the CTIA unit cell circuit; and
operating the CTIA switch to set a second reset level to a second voltage greater than the first voltage level in response to invoking a second switching state of the CTIA low-reset switch.

15. The method of claim 14, further comprising selectively establishing a parallel connection between the CTIA switch and the CTIA low-reset switch based on the switching state of the CTIA low reset switch.

16. The method of claim 15, further comprising selectively connecting a cascode bias circuit in parallel with the CTIA switch and a CTIA low-reset switch based on a switching state of the CTIA high-reset biasing switch.

17. The method of claim 16, further comprising selectively connecting the cascode bias circuit in parallel with the CTIA high-reset switch and the CTIA low-reset switch in based on a switching state of the CTIA high-reset biasing switch.

18. The method of claim 17, further comprising delivering current driven by the CTIA high-reset biasing switch to the one or both of the CTIA switch and the CTIA low-reset switch based at least in part on the switching state of the CTIA high-reset biasing switch.

19. The method of claim 18, further comprising selectively dissipating electrical charge from the CTIA unit cell circuit to prevent blooming while also setting the second reset level of the CTIA unit cell circuit based on the switching state of the CTIA switch.

20. The method of claim 14, further comprising:
selectively connecting the CTIA switch to the switching network or disconnecting the CTIA switch from the switching network;
performing a reset operation of the CTIA unit cell based at least in part on the switching state of the CTIA switch; and applying a single bias to the CTIA switch while performing the reset operation of the CTIA unit cell.

* * * * *